M. H. SHOENBERG.
FAUCET AND HOSE ATTACHMENT CLAMP.
APPLICATION FILED MAY 21, 1917.
1,239,732.
Patented Sept. 11, 1917.
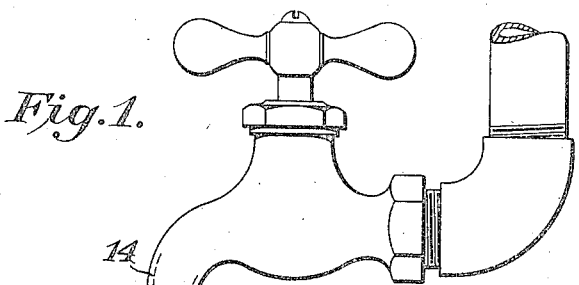
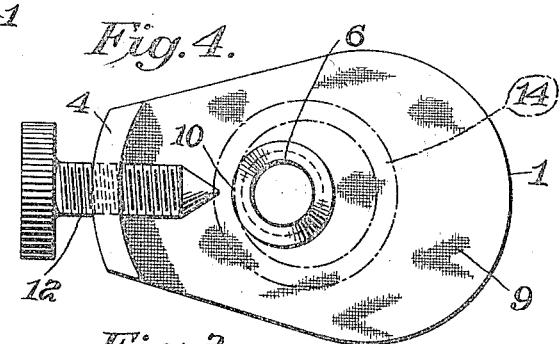
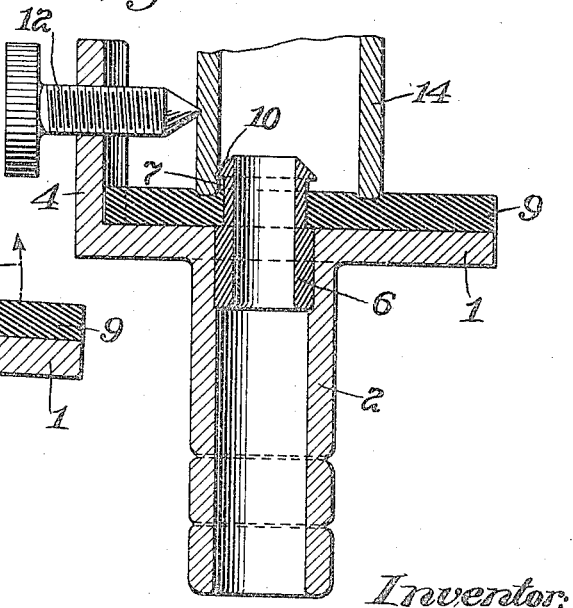
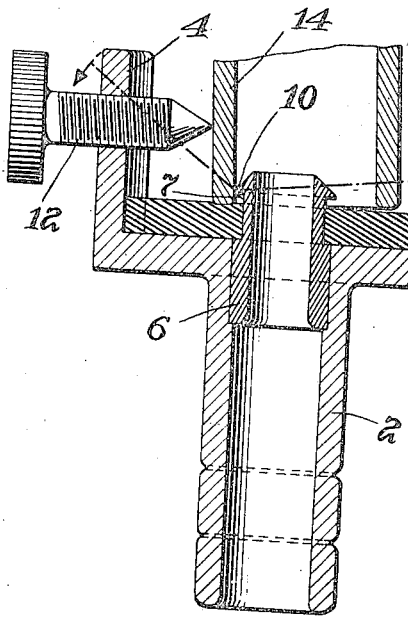
Inventor:
Milton H. Shoenberg,
by Eugene C. Brown
Atty.

UNITED STATES PATENT OFFICE.

MILTON H. SHOENBERG, OF SAN FRANCISCO, CALIFORNIA, ASSIGNOR TO MAJESTIC ELECTRIC DEVELOPMENT COMPANY, A CORPORATION OF CALIFORNIA.

FAUCET AND HOSE ATTACHMENT CLAMP.

1,239,732.

Specification of Letters Patent.

Patented Sept. 11, 1917.

Application filed May 21, 1917. Serial No. 169,905.

*To all whom it may concern:*

Be it known that I, MILTON H. SHOENBERG, a citizen of the United States, residing at San Francisco, in the county of San Francisco and State of California, have invented certain new and useful Improvements in Faucet and Hose Attachment Clamps, of which the following is a specification.

My invention relates to a clamping device for attachment to faucets, pipes, etc., and embodies an outlet channel member provided with means for tightly closing the joint between said member and the faucet or pipe.

The main purpose of my invention is to provide a universal clamping device that may be connected to any suitable faucet or outlet pipe of any ordinary size or configuration and which may be easily and quickly attached to or detached from the faucet or pipe end.

In the accompanying drawings, Figure 1 is a side elevation of a clamping device embodying my invention and showing also the manner of attachment to a faucet; Figs. 2 and 3 are vertical sections of the same upon an enlarged scale; and Fig. 4 is a cross section on the line 4—4 of Fig. 1.

The main frame or supporting member of my faucet clamping attachment consists of an L-shaped bracket having a base plate 1 which may conveniently be ovoidal in shape, as illustrated in Fig. 4, and provided with a depending tubular extension 2 adapted to receive and support a flexible outlet tube and at one end having an upwardly extending flange member 4 which is preferably arcuate. The plate 1 is provided with an aperture in alinement with the bore of the tube 2 and which forms a continuation thereof. A short tubular member 6 is inserted within the bore of the tube and projects upwardly above the surface of the base plate. This extension is provided with an annular peripheral groove or recess 7 adapted to hold a rubber gasket 9, the upper end of the tubular member being chamfered or beveled to form a sharp annular edge 10 adapted to bite against the interior wall of the faucet or pipe and to form a fulcrum or pivot point about which the L-shaped support is swung in securing the clamping attachment to a faucet.

For the purpose of securing the clamp to a pipe or faucet I provide the upwardly extending portion 4 with a threaded aperture to receive the clamping screw 12. I place this screw at a distance above the fulcrum biting edge 10 so that when pressure is exerted against the faucet or pipe 14 by turning the screw 12, the part 4 will be forced outwardly and causing the L-shaped support to swing about the pivot point 10 in the direction indicated by the arrows thereby causing the base plate 1 to move upwardly until the gasket 9 is clamped firmly between the end of the faucet and the base plate, thus causing the end of the faucet or pipe to indent or become embedded in the rubber gasket as indicated in Fig. 3.

It will be observed that the pressure or thrust exerted upon the threads when the screw 12 is being turned to swing the angle bracket or L-shaped support about the fulcrum point 10, as indicated in Fig. 2, is substantially perpendicular to said threads, and this pressure is distributed over the several threads that are in engagement with the bracket arm 4 so that there is no danger of injuring or jamming the threads. It will be further observed that by spacing the bracket arm 4 a distance from the wall of the pipe 14, I have increased the leverage between the fulcrum point 10 and the point at which pressure is exerted to swing the bracket or support upwardly against the bottom end of the faucet or pipe 14. Furthermore since any downward pull upon the tubular extension 2 tends to cause the sharp edge 10 to bite more firmly into the wall of the faucet or pipe, this construction results in an exceedingly strong and secure coupling. The hose 15 may be secured to the tubular extension 2 in any suitable manner.

I have described in detail the particular construction illustrated in the accompanying drawings for the purpose of clearly disclosing an embodiment of my invention but it is to be understood that I intend to cover in the appended claims any modifications or changes which may be made within the spirit of my invention. I have illustrated the tubular member 6 as a separate piece driven into the bore of the tube 2 and fitting tightly therein, but it is evident that this may be made as an integral part thereof. While it is preferable that the member 6 should be tubular, the clamping functions can be performed by an upwardly extending part of any suitable shape so long as there is provided the fulcrum edge 10 to coöperate with the adjustable screw 12. Other changes will be obvious to those familiar with devices of this character.

I claim:—

1. A hose and faucet coupling, comprising a closure plate for positioning over a faucet or pipe outlet and having a tubular extension depending therefrom the bore of which extends through the plate, an upwardly extending bracket arm, an adjustable clamping screw carried by said arm, and a member extending upwardly from said plate having a lug or flange located between said screw and the plate and adapted to engage the inner wall of the faucet to serve as a fulcrum and coöperate with the screw bearing against the outer wall of the faucet in forcing the base plate against the faucet outlet and clamping the plate thereto.

2. A hose and faucet coupling, comprising a closure plate for positioning over a faucet or pipe outlet and having a tubular extension depending therefrom the bore of which extends through the plate, an upwardly extending bracket arm, an adjustable clamping screw carried by said arm, and a tubular member secured within the bore of said extension and projecting above the plate and having a lug or flange located between said screw and the plate to serve as a fulcrum and adapted to engage the inner wall of the faucet or pipe.

3. A hose and faucet coupling comprising a closure plate for positioning over a faucet or pipe outlet and having a tubular extension depending therefrom the bore of which extends through the plate, an upwardly extending bracket arm, an adjustable clamping screw carried by said arm, a tubular projection extending from said plate in alinement with the bore of said extension and having a portion adapted to bear against the inner wall of the faucet or pipe between said screw and the plate to serve as a fulcrum, and a yieldable packing resting on said plate and surrounding said tubular projection.

4. A hose and faucet coupling comprising an angle bracket having a base plate for positioning over a faucet or pipe outlet and an arm at one side thereof, a tubular extension depending oppositely from said arm the bore of which extends through the plate, an adjustable clamping screw carried by said arm adapted to engage the outer wall of the faucet, and a member projecting from said plate provided with a lateral biting edge to engage the inner wall of the faucet and serve as a fulcrum between the screw and the plate.

5. A hose and faucet coupling comprising an angle bracket having a base plate for positioning over a faucet or pipe outlet and an arm at one side thereof, a tubular extension depending oppositely from said arm the bore of which extends through the plate, an adjustable clamping screw carried by said arm adapted to engage the outer wall of the faucet, a tubular projection extending from the plate in alinement with the bore of said tubular extension and having an annular flange located between said screw and the plate, and a yieldable packing resting on said plate and surrounding said tubular projection.

In testimony whereof I affix my signature.

MILTON H. SHOENBERG.

Copies of this patent may be obtained for five cents each, by addressing the "Commissioner of Patents, Washington, D. C."